United States Patent
Liu et al.

(10) Patent No.: US 11,784,511 B2
(45) Date of Patent: Oct. 10, 2023

(54) THROUGH-DISPLAY WIRELESS CHARGING

(71) Applicant: Apple Inc., Cupertino, CA (US)

(72) Inventors: Nan Liu, Sunnyvale, CA (US); Madhusudanan Keezhveedi Sampath, San Jose, CA (US); Robert Scritzky, Sunnyvale, CA (US); Gianpaolo Lisi, Los Gatos, CA (US); Saining Ren, Cupertino, CA (US); Kunal Bhargava, Cupertino, CA (US); Zaki Moussaoui, San Carlos, CA (US); Zelin Xu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 78 days.

(21) Appl. No.: 17/217,451

(22) Filed: Mar. 30, 2021

(65) Prior Publication Data
US 2021/0408826 A1 Dec. 30, 2021

Related U.S. Application Data

(60) Provisional application No. 63/044,594, filed on Jun. 26, 2020.

(51) Int. Cl.
| | |
|---|---|
| *H02J 50/10* | (2016.01) |
| *H02J 7/02* | (2016.01) |
| *H02J 7/00* | (2006.01) |
| *G06F 1/18* | (2006.01) |
| *G06F 3/0354* | (2013.01) |

(Continued)

(52) U.S. Cl.
CPC ........... *H02J 50/10* (2016.02); *G06F 1/1626* (2013.01); *G06F 1/182* (2013.01); *G06F 3/038* (2013.01);
(Continued)

(58) Field of Classification Search
CPC ....................................................... H02J 50/10
(Continued)

(56) References Cited

U.S. PATENT DOCUMENTS

| | | | |
|---|---|---|---|
| 2016/0094051 A1* | 3/2016 | Soar | H04B 5/0031 307/9.1 |
| 2017/0133881 A1* | 5/2017 | Cho | G06F 1/00 |

(Continued)

FOREIGN PATENT DOCUMENTS

| | | | |
|---|---|---|---|
| CN | 110459837 A | * 11/2019 | H01M 10/615 |

OTHER PUBLICATIONS

"Ferrite (magnet)," from Wikipedia, the free encyclopedia, Retrieved from the Internet: URL: https://en.wikipedia.org/wiki/Ferrite_(magnet) [Retrieved on Jun. 9, 2020].

(Continued)

*Primary Examiner* — Edward Tso
*Assistant Examiner* — Ahmed H Omar
(74) *Attorney, Agent, or Firm* — FLETCHER YODER PC

(57) ABSTRACT

A personal electronic device (e.g., a tablet computer) may be configured to wirelessly charge an accessory (e.g., a stylus) through a display face of the device. At least a portion of the display face may be transparent to facilitate display viewing. A wireless charging assembly disposed within the enclosure may include a core having one or more windings disposed thereon, which may be configured to generate a magnetic flux above the display face to couple to the accessory. The core may be a pot core, a modified pot core, or may have another shape, such as a PQ core. The one or more windings may be disposed on one or more posts of a pot core, or additionally or alternatively, may be disposed on another portion of the core. A metallic shield may be disposed about the wireless charging assembly, thereby surrounding multiple sides of the wireless charging assembly.

27 Claims, 2 Drawing Sheets

(51) Int. Cl.
　　　*G06F 3/038*　　　(2013.01)
　　　*G06F 1/16*　　　(2006.01)
　　　*H02J 50/00*　　　(2016.01)

(52) U.S. Cl.
　　　CPC ........ *G06F 3/03545* (2013.01); *H02J 7/0042*
　　　　　(2013.01); *H02J 7/02* (2013.01); *H02J 50/005*
　　　　　　　　　　　　　　　　　　　　　　(2020.01)

(58) Field of Classification Search
　　　USPC .......................................................... 320/108
　　　See application file for complete search history.

(56) References Cited

U.S. PATENT DOCUMENTS

| | | | |
|---|---|---|---|
| 2019/0103764 A1* | 4/2019 | Marshall | G06F 3/03545 |
| 2019/0305591 A1* | 10/2019 | Ng | H02J 50/12 |
| 2021/0194153 A1* | 6/2021 | Khripkov | H01Q 13/10 |

OTHER PUBLICATIONS

"Magnetic Core," from Wikipedia, the free encyclopedia, Retrieved from the Internet: URL: https://en.wikipedia.org/wiki/Magnetic_core [Retrieved on Jun. 9, 2020].

Magnetics, "Learn More about Ferrite Pot Cores," Retrieved from the Internet: URL: https://www.mag-inc.com/Products/Ferrite-Cores/Ferrite-Pot-Cores/Learn-More-about-Ferrite-Pot-Cores [Retrieved on Jun. 9, 2020].

TDK, "Ferrite Cores for Switching Power Supplies—PQ Series," Mar. 2014.

* cited by examiner

THROUGH-DISPLAY WIRELESS CHARGING

BACKGROUND

Personal electronic devices may include a variety of portable devices that may be carried around users to provide communications, computing, and similar functions wherever a user may be. Such devices are typically battery powered. Modern personal electronic devices may be used with a variety of accessories, which may themselves also be battery powered. For example, personal electronic devices such as smartphones, tablet computers, and even laptop computers may be used in conjunction with accessories such as smart watches, wireless earphones/earbuds, styluses, and the like. In at least some applications, it may be desirable for personal electronic devices to provide the capability to charge associated accessories. In some embodiments, such charging may be provided by a wired connection between the personal electronic device and the accessory. In other embodiments, such charging may be provided by a wireless connection between the personal electronic device and the accessory.

SUMMARY

For at least some applications, it may therefore be desirable to provide enhanced configurations of personal electronic devices to allow for more reliable and/or convenient wireless charging. In one embodiment, such a configuration can include a tablet computer or smart phone that is configured to allow for a stylus or other accessory to be wirelessly charged on a face of the personal electronic device, e.g., thorough a display of the personal electronic device.

A personal electronic device may be configured to provide wireless charging to an accessory. The personal electronic device can include an enclosure containing components of the personal electronic device. The enclosure can include at least one component defining a face of the enclosure, wherein at least a portion of the face may be transparent to facilitate viewing of a display of the personal electronic device. A wireless charging assembly may be disposed within the enclosure. The wireless charging assembly can include a core having one or more windings disposed thereon, which may be configured to generate a magnetic flux above the face to couple to the accessory, thereby providing power wirelessly to the accessory when the accessory is disposed at a predetermined location on the face of the enclosure.

The enclosure may be defined by a top glass forming the face, a perimeter frame forming sides of the enclosure, and a back forming a surface opposite the face. The perimeter frame may be metallic or may be made from another material, such as plastic. The back may be glass or may be made from another material, such as plastic or a metal.

The of the wireless charging assembly may a pot core or a modified pot core. The core may also be of other shapes, such as a PQ core. The one or more windings may be disposed on one or more posts of the pot core. Additionally or alternatively, the one or more windings may be disposed on another portion of the pot core, such as a central portion between the posts. The one or more windings can include a winding having a first portion wound in a first direction (e.g., clockwise) about a first post of the pot core and a second portion wound in a second direction (e.g., counter clockwise) about a second post of the pot core.

The personal electronic device can further include a metallic shield disposed about the wireless charging assembly. The magnetic shield may surround multiple sides of the wireless charging assembly, including five sides, four sides, or fewer sides. The wireless charging assembly of the personal electronic device may further comprises a spacer disposed between posts of the core and configured to provide mechanical reinforcement to the core. The spacer may be bonded to the core.

A wireless charging assembly may be configured to provide accessory charging in a personal electronic device. Such a wireless charging assembly can include a core configured to be disposed below a display face of the personal electronic device and one or more windings disposed on the core and configured to generate a magnetic flux above the display face, thereby providing power wirelessly to an accessory when the accessory is disposed at a predetermined location on the display face. The core may be a pot core or a modified pot core, or other core design, such as a PQ core. The one or more windings may be disposed on one or more posts of the pot core. Alternatively or additionally, the one or more windings may be disposed on another portion of the core, such as a central portion of the pot core located between the two posts. The one or more windings can include a winding having a first portion wound in a first direction (e.g., clockwise) about a first post of the pot core and a second portion wound in a second direction (e.g., counter-clockwise) about a second post of the pot core.

The wireless charging assembly can further include a metallic shield disposed about the wireless charging assembly. The metallic shield may surround a plurality of sides of the wireless charging sides, including five sides, four sides, or fewer sides. The wireless charging assembly may further include a spacer disposed between posts of the pot core and configured to provide mechanical reinforcement to the core. The spacer may be bonded to the core.

A tablet computer may be configured to provide charging of a stylus through a display glass of the tablet computer. The tablet computer can include an enclosure defined by the top glass, a perimeter frame, and a back, with the enclosure containing components of the tablet computer. The components may include a wireless accessory charging assembly including a core disposed below the top glass and one or more windings disposed on the core and configured to generate a magnetic flux above the top glass, thereby providing power wirelessly to the stylus when the stylus is placed at a predetermined location on the display face. The tablet computer may further include one or more locating assemblies, such as magnets, configured to secure the stylus in the predetermined location. The perimeter frame is metallic or may be a non-metallic material such as a plastic. The back may be glass or may be another non-metallic material, such as a plastic, or may be formed of a metallic material.

The wireless charging assembly contained within the tablet may a pot core or a modified pot core. In such case, the one or more windings may be disposed on one or more posts of the pot core. Alternatively or additionally, the one or more windings may be disposed on another portion of the pot core or modified pot core, such as a central portion of the pot core located between the two posts. The one or more windings can include a winding having a first portion wound in a first direction about a first post of the pot core and a second portion wound in a second direction about a second post of the pot core. The wireless charging assembly can further include a metallic shield disposed about the wireless charging assembly.

DETAILED DESCRIPTION

Figure 1:
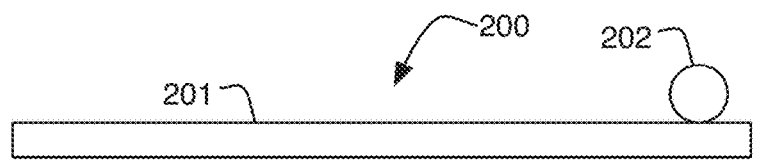
FIG. 1 illustrates an alternative wireless charging embodiment of a stylus by a tablet computer.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth in order to provide a thorough understanding of the implementations described herein. In other instances, methods, procedures and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

FIG. 1 illustrates an exemplary system 200 that allows a personal electronic device 201 (e.g., a tablet computer such as the iPad® mobile digital device produced by Apple Inc. of Cupertino, Calif.) to charge an accessory, e.g., an active stylus 202 (which may be, for example, an Apple Pencil® computer input device). More specifically, personal electronic device 201 may include a wireless power transmitter (not shown in FIG. 1) disposed in its housing that allows personal electronic device 201 to wirelessly recharge a battery in accessory/stylus 202 when accessory/stylus 202 is brought within proximity of the wireless power transmitter.

In some embodiments, personal electronic device 201 may be configured with one or more locating assemblies to provide appropriate positioning of accessory 202 with respect to device 201 such that wireless power transmitter coil(s) of device 201 are properly aligned with wireless power receiver coil(s) of accessory 202. These locating assemblies can include one or more magnets, either permanent magnets or electromagnetics, located in each of device 201 and accessory 202 and configured so that their force causes accessory 202 to be secured to device 201 in a position in which the wireless power transfer coils are aligned. Alternatively or additionally, such locating assemblies can include specially configured surfaces of device 201 or accessory 202, tabs, pins, etc.

In some embodiments, accessory 202 may have a thickness (diameter/vertical height in FIG. 1) that is somewhat greater than a thickness/height of device 201. Such a configuration may arise for a variety of reasons relating to the configuration, intended use, and ergonomics of the respective devices. For example, it may be desirable to reduce a thickness of device 201 so as to make it smaller, lighter, etc. Such reduced thickness may be desirable in some or all use cases of personal electronic device 201. However, in the case of accessory 202, it may be desirable to maintain a thickness at a certain level. In the case of a stylus, for example, it may be ergonomically preferable for accessory 202 to maintain a thickness that generally corresponds to the thickness of typical writing instruments. This can create a situation in which it may not be desirable to attach an accessory 202 (such as a stylus) to the side of a personal electronic device 201 (such as a tablet), because placing the combination in the charging configuration on a horizontal surface (not shown) such as a tabletop, may cause the accessory to be dislodged from the charging configuration.

Thus, in some embodiments, it may be preferred to have a charging configuration that places accessory 202 on a face of device 201, as illustrated in FIG. 1. This can allow the combination in the charging configuration to be set down on a horizontal surface without dislodging accessory 202 from its charging position. This, in turn, can allow device 201 to continue charging accessory 202. However, as described in greater detail below, such a configuration should preferably be designed to ensure that electromagnetic flux associated with the wireless charging operation does not interfere with operation of personal electronic device 201. Particularly, it may be desirable to provide a configuration in which the magnetic charging assembly does not interfere with a display and/or touch-sensing electronics of device 201.

Figure 2:
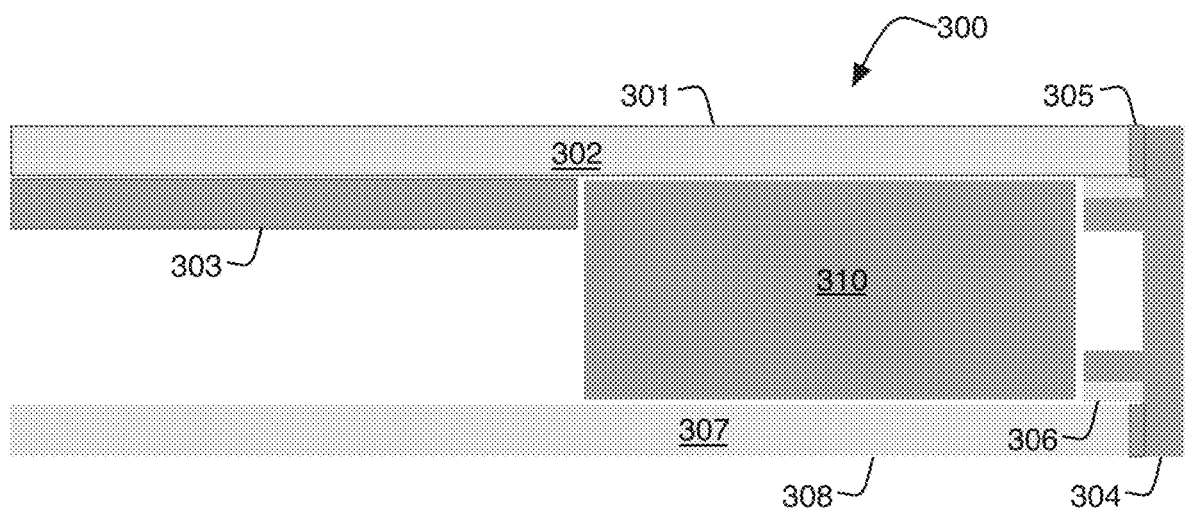
FIG. 2 illustrates an exemplary configuration of a personal electronic device to facilitate charging of an accessory.

FIG. 2 illustrates a high level schematic of a personal electronic device 300 that is configured to allow wireless charging through a face 301 of device 300. In some embodiments, device 300 may be a tablet computer. In other embodiments, device 300 may be a smartphone. In still other embodiments, device 300 may be a notebook computer. In at least some embodiments, face 301 may include a display face, i.e., a face that is wholly or partially defined by a substantially transparent glass or plastic portion 302 that allows a user to perceive a display 303 therethrough. Glass or plastic portion 302 may also be referred to herein as a display glass or cover glass, although it will be understood that it need not be made of glass, as it may be made of a variety of different types of glass, plastic, or similar material depending on the application.

Display 303 may take a variety of forms. In some embodiments, display 303 may be a touch-sensitive display, including a capacitive multi-touch display. Such a configuration may include a variety of layers that are omitted from FIG.

3A for clarity. Such layers may include multiple layers associated with the display portion (such as layers of a liquid crystal display, light emitting diode, display, organic LED display, etc.). Such layers may also include multiple layers associated with the touch sensing portion (drive electrode layers, sense electrode layers, etc.) The various layers may be disposed and/or interleaved in any suitable arrangement.

Device 300 may be contained within a housing that is defined by the cover glass 302, housing frame 304, and back 307. Housing frame 304 may be made of a metallic material such as aluminum or stainless steel. In other embodiments, housing frame 304 could be made of a non-metallic material, such as a suitable plastic. The material and its electrical and magnetic properties may be relevant to design and configuration of the wireless power transmitter assembly, as described in greater detail below. Housing frame 304 may be a single piece that defines the entire perimeter of the device. In other embodiments, housing frame 304 may be constructed in segments. In either case, housing frame 304 may be joined to cover glass 302 and back 307 by any suitable arrangement 305, which may include an adhesive or other suitable connecting system. In at least some embodiments spacers 306 may be provided to cushion, position, and or provide a suitable visual effect when looking at the top face 301 or bottom face 308 of device 300.

The back 307 of device 300 may be made of a metallic material, such as aluminum or stainless steel. In other embodiments, back 307 may be made from a non-metallic material, such as plastic or glass. As with frame 304, the electrical and material properties of back 307 may be relevant to the design and configuration of the wireless power transmitter assembly, as described in greater detail below.

Top glass 302, frame 304, and back 307 define the enclosure of personal electronic device 300. Also contained within the enclosure of device 300 is the wireless charging assembly 310. The cross-sectional shape of wireless charging assembly 310 depicted in FIG. 2 is schematic only, and is meant to depict that the exact shape may take a variety of forms depending on the particular design. In at least some embodiments, it may be desirable for wireless charging assembly 310 to butt up against the underside of display glass 302 at the location where accessory 202 (not shown in FIG. 2) will be positioned for charging. The thickness of display glass 302 may be a significant portion of the "air-gap" between the charging coil and a receiving coil in the accessory to be charged. Thus, it may be desirable to control/optimize this thickness. For example, it may be desirable for display glass 302 to have a thickness less than about 0.3 mm. Additionally, it will be necessary for charging assembly 310 to fit around display components 303 and housing frame 304 to fit the available space within the enclosure of a particular embodiment. It will be appreciated that it is often desirable to maximize space used (or minimize wasted space) within personal electronic devices to reduce their size. However, in at least some embodiments, some free space may be provided if required, for example, if necessary for cooling or other design considerations.

Figure 3:
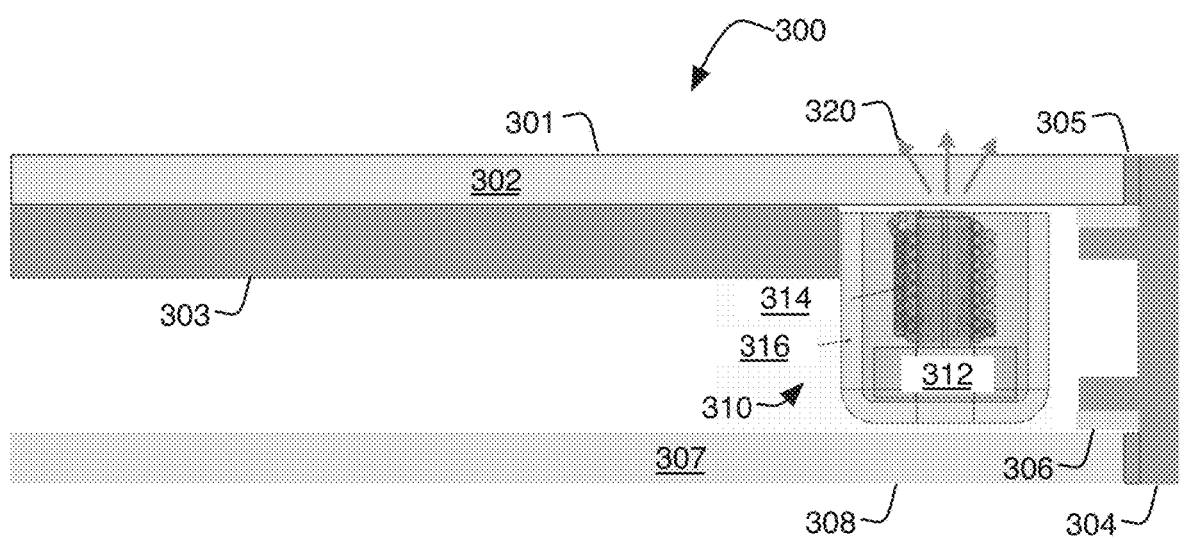
FIG. 3 illustrates an exemplary configuration of a personal electronic device to facilitate charging of an accessory.

FIG. 3 illustrates a slightly more detailed cross-sectional view of device 300. Corresponding elements have been identified with corresponding numbers for the items discussed in FIG. 2. The depiction of wireless charging assembly 310 has been expanded to show certain of its components. More specifically, wireless charging assembly 310 includes a ferrite core 312, which may take a variety of forms as described in greater detail below. Wireless charging assembly 310 also includes a transmitter coil (or winding) 314, which may be wound around ferrite core 312 as described in greater detail below. In at least some embodiments wireless charging assembly 310 may also include a shield 316, which may be made from a metallic material. In some embodiments, shield 316 may be copper, although other suitable materials may also be used.

FIG. 3 also depicts magnetic flux 320 that may be generated by suitably driving the coil 314 using an inductive power transmitter circuit. Various embodiments of such circuits are known, and thus their details are not provided here. In general, such circuits include a power supply and an inverter that generates an AC voltage/current having a suitable frequency from the power supply. When coil 314 is driven with this AC voltage/current, magnetic flux 320 delivers energy to a wireless power receiver incorporated into an accessory positioned as shown in FIG. 1.

Figure 4:
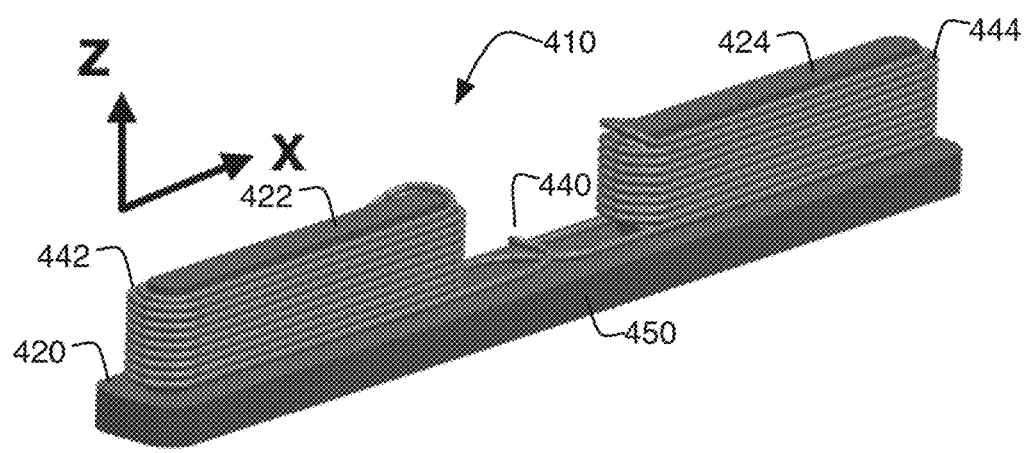
FIG. 4 illustrates an exemplary wireless charging coil configuration for a personal electronic device to facilitate charging of an accessory.

FIG. 4 illustrates a perspective view of a wireless charging coil assembly 410 that may be used for accessory charging in a personal electronic device. Wireless coil charging assembly 410 may correspond to wireless charging assembly 310 illustrated in edge-on view in FIGS. 2 and 3. Wireless charging coil assembly 410 can include a core 420 having a winding 440 disposed thereon. Numerous different core and winding configurations may be employed, and the illustrated configuration is but one example. Core 420 may be made of any suitable high-permeability magnetic material, such as ferrite. Various ferrite materials are available and are suitable for different applications depending on field strength, frequency, and other design parameters.

Exemplary core 420 in FIG. 4 may be considered a pot core or modified pot core design, which includes posts 422 and 424 about which winding 440 is disposed, as described in greater detail below. In other configurations, winding 440 may be disposed about another portion of the core, such as central portion 450. Pot cores may be identified by their base portion (e.g., 420) and a central post (e.g., 422, 424) about which a winding may be disposed. Some pot cores may also include raised walls extending from the base that circumscribe the post or posts. The shape of such cores may be considered to be generally similar to a cooking pot, hence the reason for their name. It should be noted that core 420 in FIG. 4 does not include the wall portions, and includes two posts 422, 424 about which the windings are disposed, and thus may be considered to be a modified pot core (as noted above). Pot core and modified pot core configurations may be advantageous for at least some embodiments because they can reduce eddy currents in shield 316 (discussed briefly above and in more detail below with respect to FIGS. 5 and 6). However, other core configurations may also be used, including PQ cores or other suitable core shapes.

Winding 440 may be formed from a conductive wire made of copper or other suitable material that is wound about core 420. Winding 440 may be formed from magnet wire, Litz wire, or any other suitable wire. Winding 440 may be configured such that an alternating current flowing in the wire (generated by the wireless charging circuit inverter described above) induces a magnetic flux that can couple to a receiver to deliver energy wirelessly. In the embodiment of FIG. 4, winding 440 includes a first portion 442 that is wound clockwise around post 442 and a second portion 444 that is wound counter-clockwise around 424. Current flow through coil 440 will therefore generate a magnetic flux that leaves core 440 in one direction from one post of the core (e.g., upward out of post 442) and returns to core 440 in the other direction via the other post of the core (e.g., downward into post 444). Because the current supplied to coil 440 is an alternating current the flux direction will change repeatedly with current reversals, but the net result is a magnetic flux that extends in an arc between the two posts and can pass through a suitable receiver coil in the accessory to be charged to deliver energy thereto. As noted above, winding 440 may additionally or alternatively be wound around other portions of the core, such as central portion 450. The particulars of a given embodiment, including ferrite dimensions, number of winding turns, wire size, etc. may vary and will, in many cases, be interrelated. The particular dimensions and similar characteristics may be calculated and optimized for a given application using known principles and are thus omitted here.

In wireless charging applications it may be desirable to contain and steer the aforementioned magnetic flux so that as much energy is possible is delivered to the receiver. This has the beneficial effects of delivering more energy to the receiver more quickly. Additional advantages of preventing magnetic flux from affecting objects other than the receiver can include preventing undesired heating of surrounding metallic objects and preventing electromagnetic interference with adjacent circuitry. As described above, personal electronic device 300 may be constructed with certain portions (e.g., frame 304 and back 307) made of a metallic/conductive material (aluminum, stainless steel, etc.) or a non-metallic/non-conductive material (glass, plastic, etc.) Depending on the particular construction, there may be different interactions between the flux generated by coil assembly 410 and the surrounding components.

Additionally, in at least some embodiments, personal electronic device 300 may include a display and/or touch sensing circuitry that may be susceptible to electromagnetic interference from the wireless accessory charging system. Thus, it may be desirable to provide shielding around the accessory wireless charging coil assembly to minimize such interactions and their deleterious effects. Moreover, providing such shielding can, in at least some embodiments, provide sufficient electromagnetic isolation between the coil assembly and adjacent components so that a single shielded coil assembly design may be incorporated into different devices that materials with different electromagnetic properties adjacent the coil. Without the shield, some amount of redesign of the coil assembly might be necessary to accommodate such electromagnetic differences in various applications.

Figure 5:
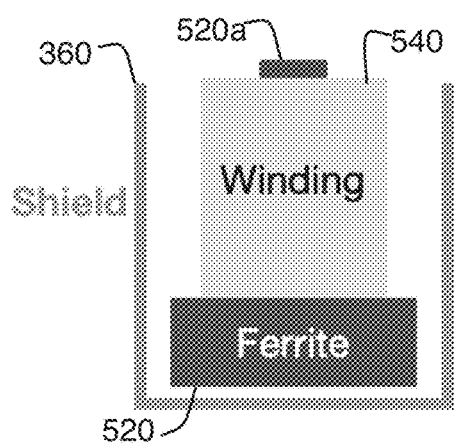
FIGS. 5 and 6 illustrate shielding arrangements that may be employed to facilitate charging of an accessory by a personal electronic device.
Figure 6:
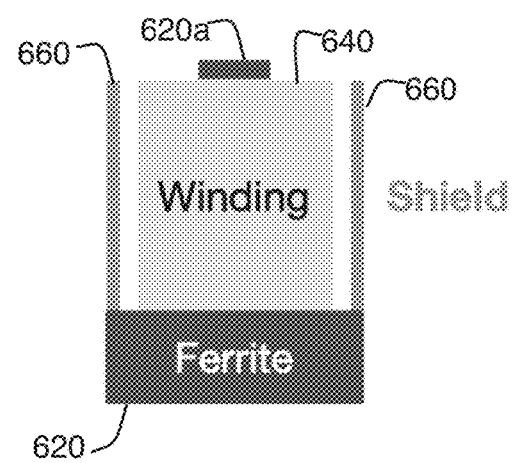

FIGS. 5 and 6 schematically depict two exemplary configurations of shielding that may be employed to that end. FIG. 5 illustrates a cross-section/end view of an accessory wireless charging coil assembly like that depicted in FIG. 4. This end view can correspond to the views depicted in FIGS. 2 and 3 discussed above. The wireless charging coil assembly includes a core/ferrite 520, including a post 520a, having a winding 540 wound thereabout. The coil assembly may further include a shield 560 disposed around the coil assembly to prevent flux escaping along paths including the shield and coupling into other objects. Shield 560 may be made of any suitable conductive material. In some embodiments, the shield may be copper. Not shown in FIG. 5, which is a cross-section/end view are the two ends of the coil assembly, which may also be shielded by shield 560. In such case shield 560 may be a five-sided rectangular prism that is open on the top to allow wireless charging of the accessory. In other embodiments, shield 560 may be open on one or both ends, if appropriate for a given application. Although shield 560 is depicted as rectangular, it may be of any other shape suitable for blocking undesired flux paths, conforming to the coil assembly and other components of personal electronic device 300, and fitting in the allotted space. Shield 560 may correspond to shield 316 depicted in FIG. 3, discussed above, which is substantially rectangular in section but includes rounded corners.

FIG. 6 illustrates an alternative cross-section/end view that differs slightly from FIG. 5. In this embodiment, the wireless charging coil assembly includes a core/ferrite 620, including a post 620a, having a winding 640 wound thereabout. The coil assembly may further include a shield 660 disposed about the sides of the coil assembly to prevent flux escaping along paths including the shield and coupling into other objects. In a departure from the embodiment of FIG. 5, shield 660 does not extend below core/ferrite 620. Rather the magnetic properties of the core/ferrite 620 itself serve to contain the flux and prevent it from escaping through the bottom of the assembly. As in the embodiment of FIG. 5, shield 660 may be made of any suitable conductive material, such as copper. Not shown in FIG. 6, which is a cross-section/end view are the two ends of the coil assembly, which may also be shielded by shield 660. In such case shield 560 may be a four-sided rectangular prism that is open on the top to allow wireless charging of the accessory and also on the bottom. In other embodiments, shield 660 may be open on one or both ends, if appropriate for a given application. Although shield 660 is depicted as rectangular, it may be of any other shape suitable for blocking undesired flux paths, conforming to the coil assembly and other components of personal electronic device 300, and fitting in the allotted space.

Figure 7:
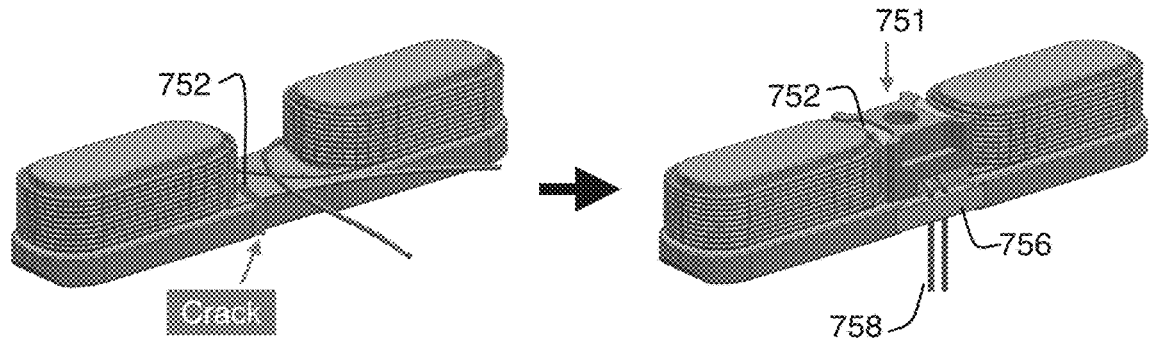
FIG. 7 illustrates an exemplary wireless charging coil configuration configured to prevent damage to the coil assembly.

Turning now to FIG. 7, an optional additional spacer component 751 will be described. Some ferrite formulations or other materials used to construct a wireless accessory charging coil assembly as described herein may be somewhat brittle. This may render the core susceptible to damage, such as crack damage at location 702. Susceptibility to this type of damage may be increased by the shape or dimensions of a particular core design embodiment, including some configurations of a pot core/modified pot core. This type of damage may be more likely during fabrication and testing of the coil and/or its assembly/integration into personal electronic device 300, but could occur at any time. To prevent this type of damage, it may be desired to provide some sort of mechanical reinforcement.

Such mechanical reinforcement may be provided by a spacer 751 as depicted in FIG. 7. Spacer 751 may be formed from any suitable non-metallic, non-conductive, or dielectric material, such as a plastic. Spacer 751 may be formed by any suitable process, such as injection molding. It may be desirable that 751 be non-metallic to prevent both electrical and magnetic interreference with the operation of the coil assembly. Depending on the particulars of a given application, spacer 751 may be formed as a unitary structure or in multiple pieces. In the illustrated embodiment, spacer 751 includes additional components 752, 754, and 756 that may optionally be used to provide additional benefits. For example, components 752 and 754 may be formed with indentations on one face that conform to the exterior shape of the respective windings with which they interface, which may help to secure the entire assembly. Likewise lower component 756 may be configured with features for routing coil leads 758. Although shown as separate components, such wire management features could also be formed into spacer 751 directly.

Additionally or alternatively, still other features may be formed into these components to achieve any of a variety of mechanical construction features or advantages. For example, spacer 751 may include one or more features, such as hole 753, that allow for manufacturing machinery to handle the coil assembly without touching the coil or ferrite portions. Additionally, for multi-post core arrangements, such as the pot core/modified pot core design illustrated herein, spacer 751 may fill what would otherwise be a void between the two posts, thereby providing mechanical support for the cover glass, for example. In at least some embodiments it may be desirable to secure spacer 751 and optional additional components 752, 756, and 758 to each other and/or to the coil assembly. This may be done in a variety of fashions, including using an adhesive. For some applications a UV-cured adhesive may be appropriate.

The foregoing describes exemplary embodiments of personal electronic devices configured to provide wireless charging to an accessory. Such systems may be used in a variety of applications but may be particularly advantageous when used in conjunction with personal electronic devices such as notebook computers, tablet computers, smart phones and the like and their accessories, such as styluses, wireless earphones, and the like. Although numerous specific features and various embodiments have been described, it is to be understood that, unless otherwise noted as being mutually exclusive, the various features and embodiments may be combined various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:

1. A personal electronic device configured to provide wireless charging to an accessory, the personal electronic device comprising:
   an enclosure containing components of the personal electronic device, the enclosure including at least one component defining a face of the enclosure, wherein at least a portion of the face is transparent to facilitate viewing of a display of the personal electronic device; and
   a wireless charging assembly disposed within the enclosure and including a core having one or more windings disposed thereon and configured to generate a magnetic flux through the transparent face to couple to the accessory, thereby providing power wirelessly to the accessory when the accessory is disposed at a predetermined location on the transparent face of the enclosure;
   wherein the wireless charging assembly further comprises a spacer disposed between two or more posts of the core that provides mechanical reinforcement to the core.

2. The personal electronic device of claim 1 wherein the enclosure is defined by a top glass forming the face, a perimeter frame forming sides of the enclosure, and a back forming a surface opposite the face.

3. The personal electronic device of claim 2 wherein the perimeter frame is metallic.

4. The personal electronic device of claim 2 wherein the back is glass.

5. The personal electronic device of claim 1 wherein the core is a pot core or a modified pot core.

6. The personal electronic device of claim 5 wherein the one or more windings are disposed on the two or more posts of the pot core.

7. The personal electronic device of claim 6 wherein the one or more windings comprise a winding having a first portion wound in a first direction about a first post of the pot core and a second portion wound in a second direction about a second post of the pot core.

8. The personal electronic device of claim 1 further comprising a metallic shield disposed about the wireless charging assembly.

9. The personal electronic device of claim 8 wherein the magnetic shield surrounds five sides of the wireless charging assembly.

10. The personal electronic device of claim 8 wherein the magnetic shield surrounds four sides of the wireless charging assembly.

11. The personal electronic device of claim 1 wherein the spacer is bonded to the core.

12. A wireless charging assembly configured to provide accessory charging in a personal electronic device, the wireless charging assembly comprising:
    a core having a plurality of posts and configured to be disposed below a display face of the personal electronic device;
    one or more windings disposed on the plurality of posts of the core and configured to generate a magnetic flux above the display face, thereby providing power wirelessly to an accessory when the accessory is disposed at a predetermined location on the display face; and
    a spacer disposed between posts of the core that provides mechanical reinforcement to the core.

13. The wireless charging assembly of claim 12 wherein the core is a pot core or a modified pot core.

14. The wireless charging assembly of claim 12 wherein the one or more windings comprise a winding having a first portion wound in a first direction about a first post of the pot core and a second portion wound in a second direction about a second post of the pot core.

15. The wireless charging assembly of claim 12 further comprising a metallic shield disposed about the wireless charging assembly.

16. The wireless charging assembly of claim 15 wherein the magnetic shield surrounds five sides of the wireless charging assembly.

17. The wireless charging assembly of claim 15 wherein the magnetic shield surrounds four sides of the wireless charging assembly.

18. The personal electronic device of claim 12 wherein the spacer is bonded to the core.

19. A tablet computer configured to provide charging of a stylus through a display glass of the tablet computer, the tablet computer comprising:
    an enclosure defined by the top glass, a perimeter frame, and a back, the enclosure containing components of the tablet computer including a wireless accessory charging assembly;
    wherein the wireless charging assembly comprises:
      a core disposed below the top glass and having a plurality of posts;
      one or more windings disposed on the core and configured to generate a magnetic flux above the top glass, thereby providing power wirelessly to the stylus when the stylus is placed at a predetermined location on the display face; and
      a spacer disposed between posts of the core that provides mechanical reinforcement to the core.

20. The tablet computer of claim 19 further comprising one or more locating assemblies configured to secure the stylus in the predetermined location.

21. The tablet computer of claim 20 wherein the locating assemblies are magnets.

22. The tablet computer of claim 19 wherein the perimeter frame is metallic.

23. The tablet computer of claim 19 wherein the back is glass.

24. The wireless charging assembly of claim 19 wherein the core is a pot core or a modified pot core.

25. The wireless charging assembly of claim 24 wherein the one or more windings are disposed on one or more posts of the pot core.

26. The wireless charging assembly of claim 25 wherein the one or more windings comprise a winding having a first portion wound in a first direction about a first post of the pot core and a second portion wound in a second direction about a second post of the pot core.

27. The wireless charging assembly of claim 26 further comprising a metallic shield disposed about the wireless charging assembly.

\* \* \* \* \*